United States Patent [19]

Shimbara

[11] Patent Number: 5,509,848
[45] Date of Patent: Apr. 23, 1996

[54] METHOD OF AND APPARATUS FOR POLISHING PAINTED SURFACES

[75] Inventor: Yoshimi Shimbara, Hiroshima, Japan

[73] Assignee: Mazda Motor Corporation, Hiroshima, Japan

[21] Appl. No.: 149,814

[22] Filed: Nov. 10, 1993

[30] Foreign Application Priority Data

Nov. 10, 1992 [JP] Japan ................................. 4-299692
Jan. 20, 1993 [JP] Japan ................................. 5-007712

[51] Int. Cl.⁶ ................................. B24B 49/00
[52] U.S. Cl. ................................. 451/24; 451/5; 451/9
[58] Field of Search ................................. 451/5, 24, 8, 9, 451/10, 11, 259, 278, 280; 901/41, 9

[56] References Cited

U.S. PATENT DOCUMENTS

| 3,518,513 | 8/1966 | Pomella et al. | 901/9 |
| 4,936,052 | 6/1990 | Nagase et al. | 451/9 |
| 4,974,368 | 12/1990 | Miyamoto et al. | 451/9 |
| 4,999,954 | 3/1991 | Miyamoto et al. | 451/5 |
| 5,077,941 | 1/1992 | Whitney | 451/259 |

FOREIGN PATENT DOCUMENTS 60-20849  2/1985  Japan.

Primary Examiner—Bruce M. Kisliuk
Assistant Examiner—Derris Banks
Attorney, Agent, or Firm—Keck, Mahin & Cate

[57] ABSTRACT

A method and apparatus for polishing a paint coated surface, in which a polishing tool is held perpendicularly to the surface, are used to apply a predetermined polishing pressure to the surface even when the surface is inclined.

8 Claims, 10 Drawing Sheets

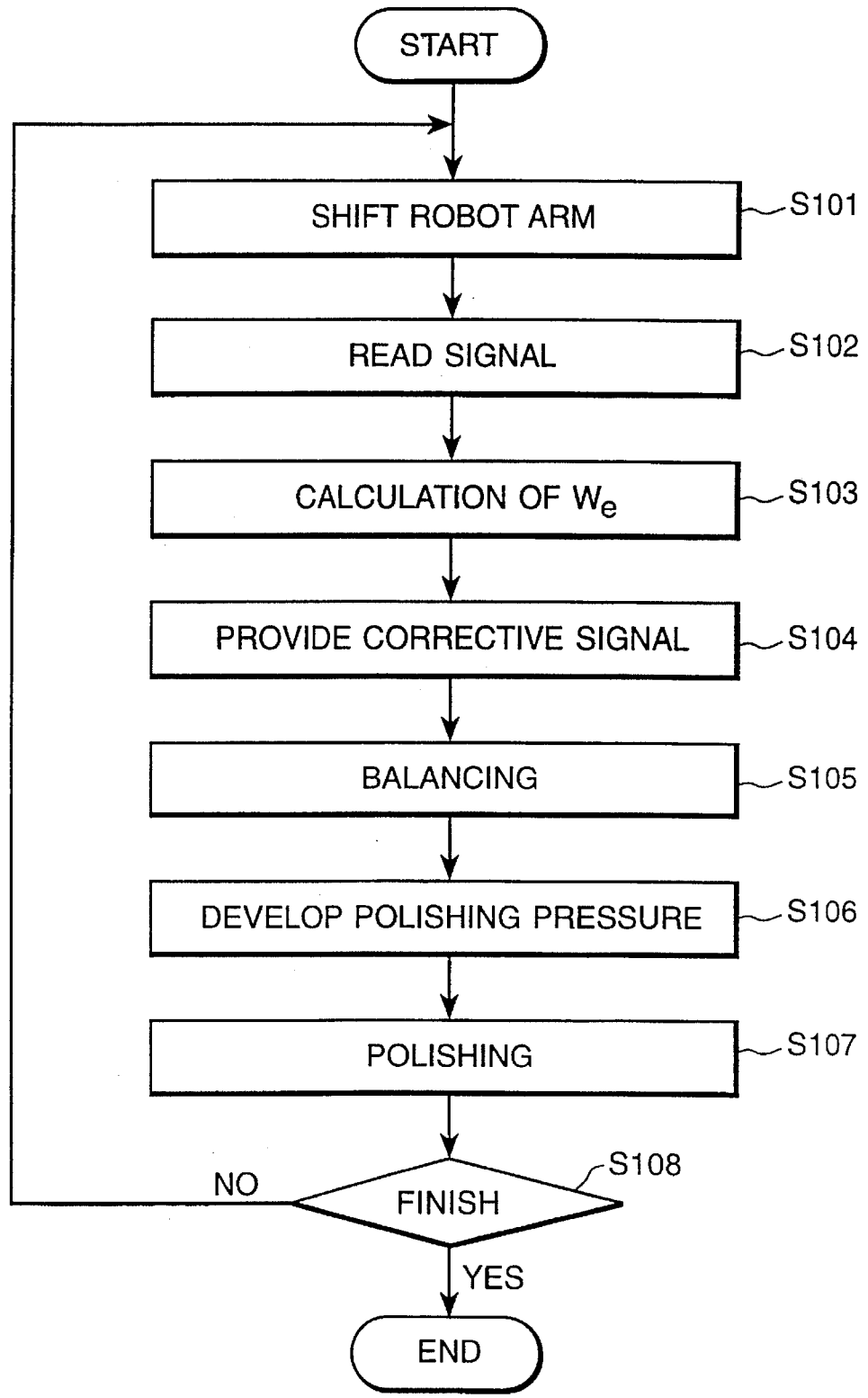

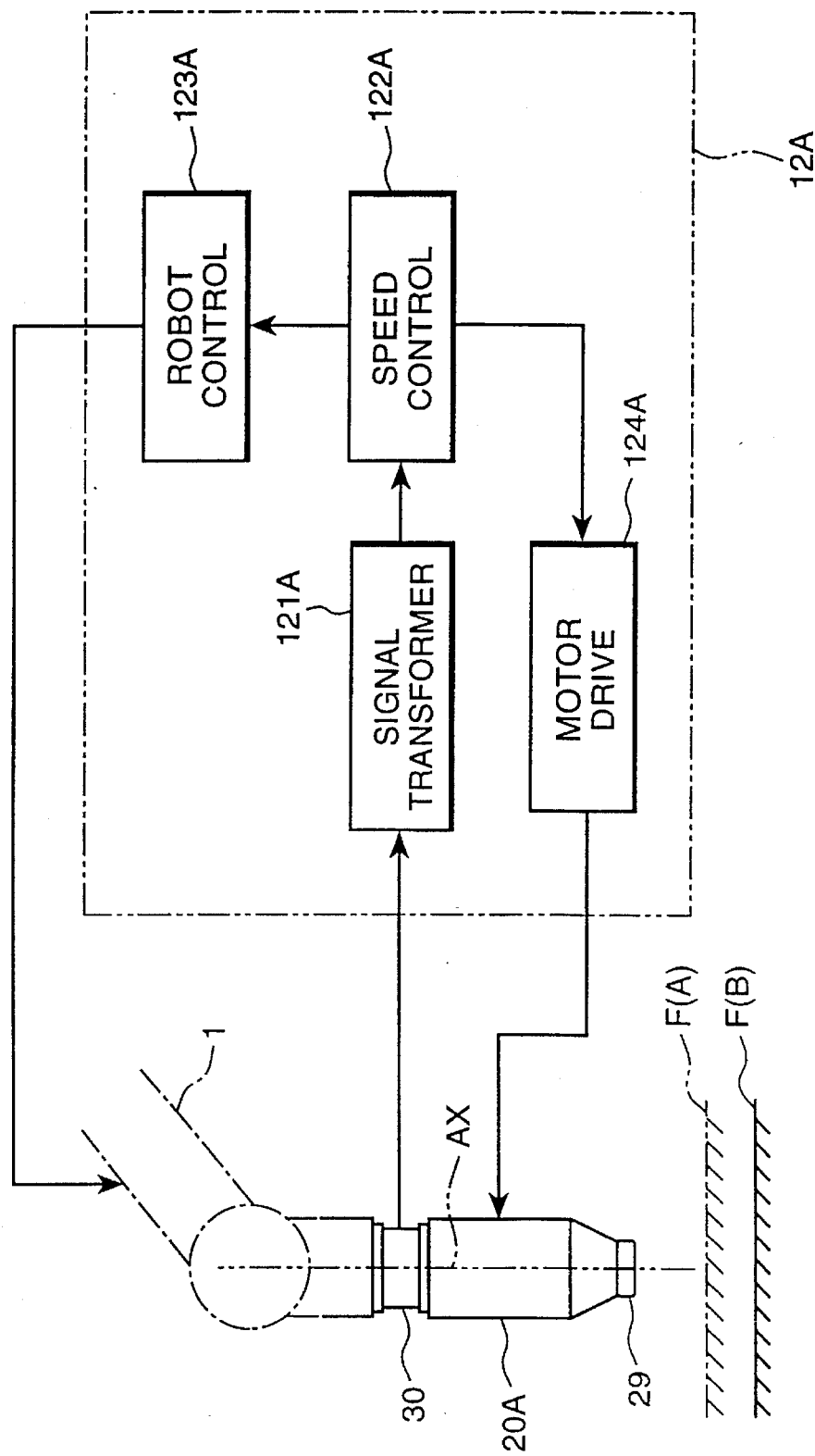

METHOD OF AND APPARATUS FOR POLISHING PAINTED SURFACES

BACKGROUND OF THE INVENTION

1. Field of the Invention

The present invention relates to a method and an apparatus for polishing painted surfaces of a plate on which an overcoat of paint is applied.

2. Description of Related Art

Polishing of painted surfaces of car bodies is performed by using industrial robots, such as a teaching-play back type of industrial robots. These polishing robots have hands holding a polishing tool which are controlled based on information relating to position and posture of the hand so as to apply a specified polishing pressure to a painted surface. Such a polishing robot is known from Japanese Unexamined Patent Publication No. 60-20849.

In order to apply a specified polishing pressure to a painted surface in spite of position and posture of the robot hand, it is essential to use a great amount of information and a number of calculations. This rendered the polishing robot difficult to be manufactured at a low cost and small in size.

When polishing a paint coated surface of, for example, a car body, which is a free surface comprising flat surfaces and curved surfaces, it is essential to place a polishing tool held by a robot arm perpendicularly to the paint coated surface. However, there are sometimes cases in which the polishing tool must be vertically inclined but is placed perpendicularly to the paint coated surface according to angles at which the surface is inclined with respect to a horizontal plane. In such a case, only a component of the whole weight of the polishing tool is applied to the inclined surface. Accordingly, an effective load of the hydraulic cylinder, according to which polishing pressure applied to the surface by a polishing tool, changes. In other words, it is hard to maintain the polishing pressure constant.

Further, because portions of the surface to be polished are different in vertical level from one another, it is essential to make sure that a predetermined polishing pressure has been developed by downward movement of the polishing tool in order to provide a high quality of polishing over the surface. For this purpose, a moved distance of the polishing tool must be monitored. Accordingly, the polishing apparatus must be provided with a distance monitor and a pressure sensor which makes a control system complicated and takes a long time for moving the polishing tool due to distance measurement. This leads to difficulties in increasing polishing efficiency.

In order to provide a constant polishing pressure over a surface to be polished in spite of differences in vertical level, a moving mechanism of the polishing tool is controlled so as to develop a predetermined pressure applied from the polishing tool to portions of the surface even in different vertical levels. Such a polishing apparatus is known from, for instance, Japanese Unexamined Patent Publication No. 60-20849.

However, controlling the moving mechanism of the polishing tool against the surface makes the polishing apparatus complicated.

SUMMARY OF THE INVENTION

It is a primary object of the present invention to provide a method and apparatus for polishing a paint coated surface which provides a constant polishing pressure in spite of portions of the surface in different vertical levels.

It is another object of the present invention to provide a method and apparatus for polishing a paint coated surface which provides a constant polishing pressure which is controlled so that it remains unchanged even though the surface is inclined with respect to a horizontal plane.

The foregoing objects of the present invention are accomplished by providing a method and apparatus for polishing a surface with a coat of paint in which a polishing tool, directed perpendicularly to a coated surface, applies a predetermined polishing pressure which is controlled by varying a hydraulic pressure introduced into a hydraulic cylinder. An angle at which the polishing tool is inclined with respect to a horizontal plane is detected by an angle sensor disposed between the hydraulic cylinder and the polishing tool. Based on the angle, an effective load of the polishing tool, which is a vertical component of the whole weight of the polishing tool inclined at the angle, is calculated. According to a difference of the effective load from a standard load of the polishing tool, which is the whole weight of the polishing tool directed vertically, the hydraulic pressure is varied.

The polishing tool is moved downward against a coated paint defect at a speed determined according to a pressure which the polishing tool applies to the paint defect. The downward movement of the polishing tool is stopped when a predetermined pressure is developed between the polishing tool and the surface defect and, approximately simultaneously, the polishing tool is driven so as to polish the coated paint defect of the surface.

BRIEF DESCRIPTION OF THE DRAWINGS

The above and other objects of the present invention will be understood from the following description directed to preferred embodiments thereof when considered in conjunction with the attached drawings, in which the same reference numerals have been used to denote the same or similar elements through several drawings, and wherein:

FIG. 9 is a flow chart of the sequence control of surface polishing by the polishing apparatus shown in FIG. 1;

FIG. 10 is a schematic view showing a polishing apparatus in accordance with another preferred embodiment of the present invention;

DETAILED DESCRIPTION OF THE PREFERRED EMBODIMENTS

Figure 1:
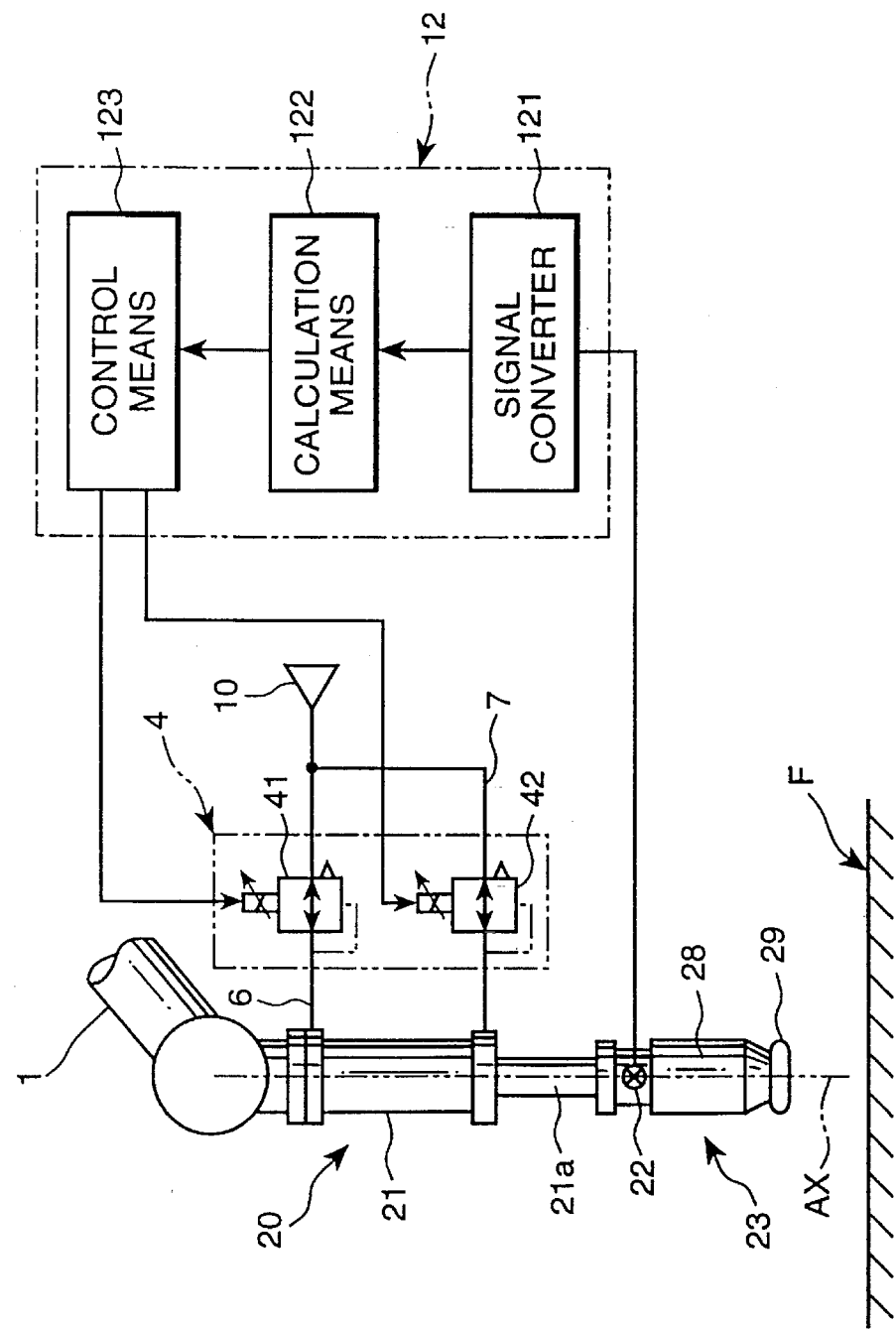
FIG. 1 is a schematic view showing a polishing apparatus in accordance with a preferred embodiment of the present invention.

Referring to the drawings in detail, and in particular to FIG. 1, a polishing apparatus 20 in accordance with a preferred embodiment of the present invention is schematically shown. This polishing apparatus 20 having a polishing pad 29 is fixedly held by an arm 1 of a teaching-playback type of general purpose robot or manipulator (not shown) well known to those skilled i the art. This robot positions the polishing apparatus 20 above a portion of a surface F applied with the coat of paint to be polished so that the center axis AX of the polishing apparatus 20 is placed perpendicularly relative to the surface F. Polishing pad 29 is pressed perpendicularly against the surface F so as to apply a predetermined polishing force to the same.

Figure 2:
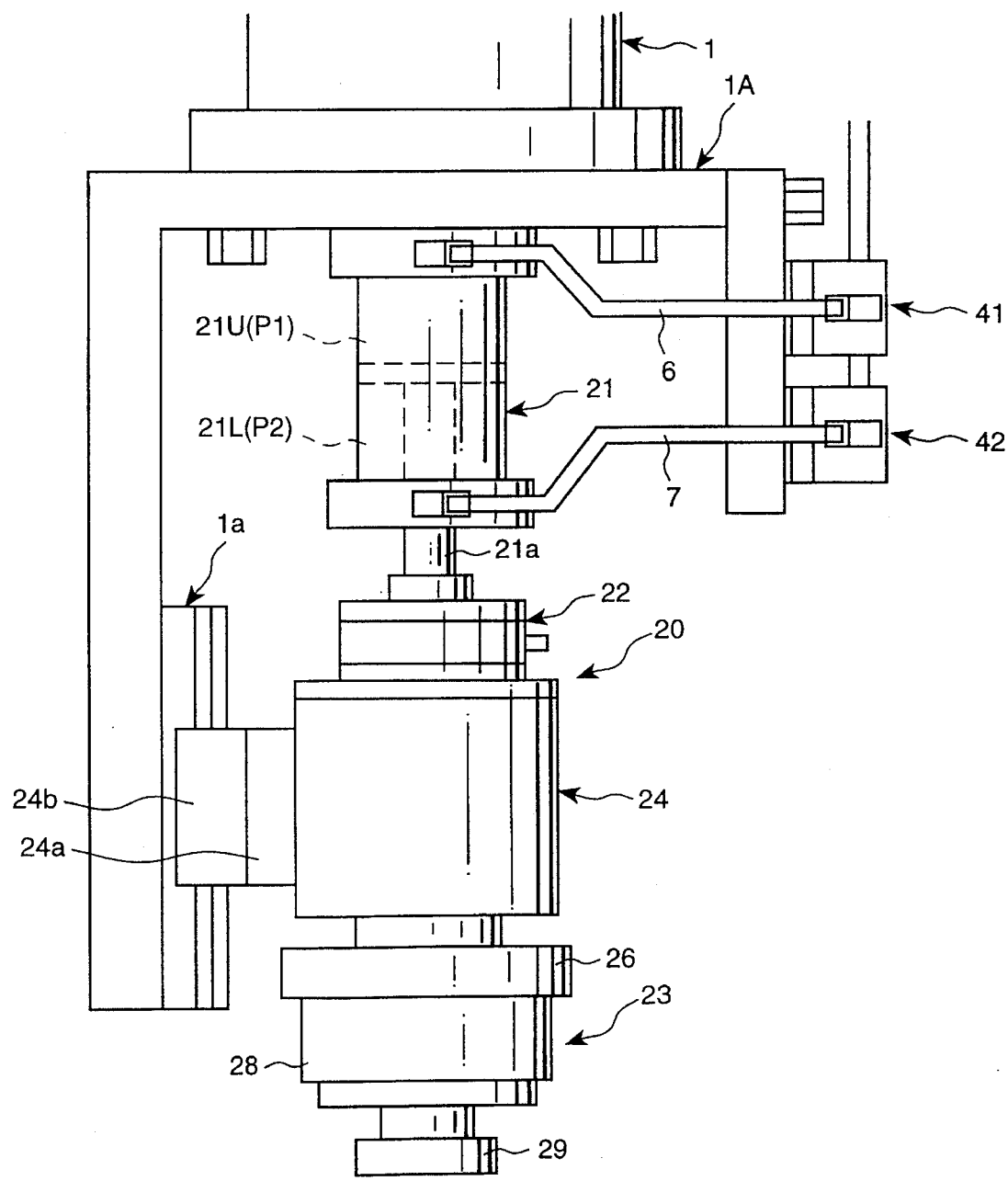
FIG. 2 is a front view showing the polishing apparatus in detail.

Referring to FIG. 2 showing the polishing apparatus 20 in detail, the polishing apparatus 20 has a hydraulic cylinder 21, such as an air cylinder, in which a piston 21a slides, fixedly secured to a generally U-shaped bracket 1A of the robot arm 1. This cylinder 21 has an upper pressure chamber 21U into which hydraulic pressure is introduced or withdrawn through a pressure line 6 and a lower pressure chamber 21L into which hydraulic pressure is introduced or withdrawn through a lower pressure line 7. The polishing apparatus 20 further has a polishing tool 23 including a motor housing 24, a polishing head 28 and the polishing pad 29. The motor housing 24, in which a motor (not shown) is installed, is connected to a U-shaped bracket 11 of the robot arm 1 through a pressure sensor, such as a strain gauge sensor 22, which will be described later. The motor housing 24 is connected to polishing head 28 by means of an articulation such as a universal joint 27 (see FIG. 3) and has a joint housing 26 mechanically integral therewith. A rotary shaft 29a (see FIG. 3) of the polishing pad 29 is supported for rotation by the polishing head 28. The motor housing 24 is provided with a bracket 24a having a guide block 24b. The U-shaped bracket 1A of the robot arm 1 is provided with a guide rail 1a on which the guide block 24b is mounted and slides up and down so as to guide the motor housing 24 in parallel with the the center axis of rotation AX.

Figure 3:
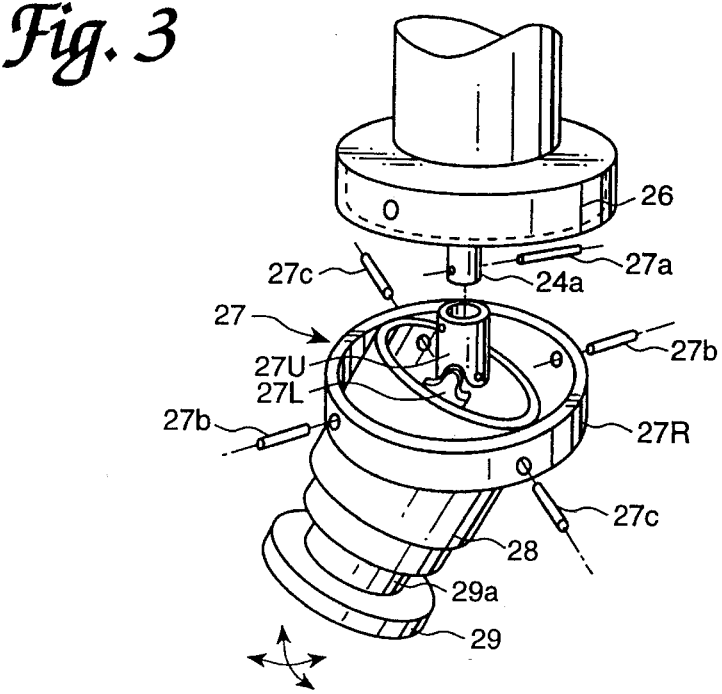
FIG. 3 is a perspective view of a universal joint.

Referring to FIG. 3 showing the configuration of the universal joint 27 connecting the motor and the polishing head 28, the universal joint 27 includes an upper joint shaft 27U connected to motor shaft 24c by means of a connecting pin 27a and a lower joint shaft 27L secured to the polishing head 28. The universal joint 27 further includes a ring 27R which is pivoted to the joint housing 26 by means of pivot shafts 27b arranged in diametrically opposite positions so that the ring 27R swings relative to the joint housing 26 about a pivot axis passing through the pivot shafts 27b and also pivoted to the polishing head 28 by means of pivot shafts 27c arranged in diametrically opposite positions so that the ring 27R swings relative to the polishing head 28 about a pivot axis passing through the pivot shafts 27c. The polishing head 28 including the polishing pad 29 can incline in any direction, with respect to the axis of AX.

Figure 4:
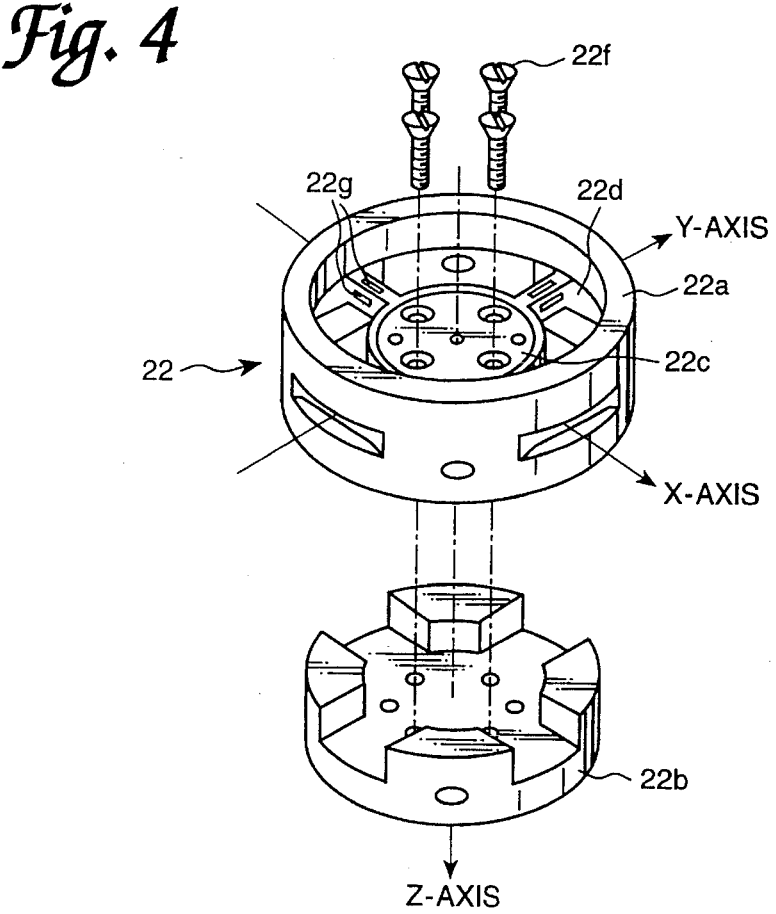
FIG. 4 is an exploded view of a strain gauge.

Referring to FIG. 4 showing the configuration of the strain gauge sensor 22 disposed between the piston 21a and the polishing tool 23, the strain gauge sensor 22 comprises a sensor housing 22a to which the piston 21a is secured and a mounting disk 22b to which the motor housing 24 is secured. The sensor housing 22a and the mounting disk 22b are interconnected by means of a cross beam disk 22c. Specifically, the cross beam disk 22c is, on one hand, connected to the sensor housing 22a by means of four beams 22d arranged at regular angular displacements which are formed integrally with the base disk 22c. Disk 22c on the other hand is, secured to the mounting disk 22b by set screws 22f. On each beam 22d there are provided two strain gauges 22g for detecting a slight deformation of the beam 22d. If the polishing apparatus 22 inclines with respect to a vertical axis, the respective beams 22d deform due to the dead weight of the polishing tool 22. In addition, if the polishing tool 22 inclines relative to the center axis AX of the polishing apparatus 20, the respective beams deform. Thus, the strain gauge sensor 22 detects the angle of the polishing tool 23 with respect to the vertical axis and the center axis.

Pneumatic pressure introduced into each of the upper and lower pressure chambers 21U and 21L of the cylinder 21 is regulated by means of a pressure regulating means 4 including first and second electromagnetic valves 41 and 42 which are controlled by the controller 12. Specifically, a pressure P1 introduced into the upper pressure chamber 21U from an air pump 10 is regulated by the electromagnetic valve 41 so as to force the piston rod 21a downward. A pressure P2 introduced into the lower pressure chamber 21L from the air pump 10 is regulated by the electromagnetic valve 42 so as to force the piston rod 21a upward.

Figure 5:
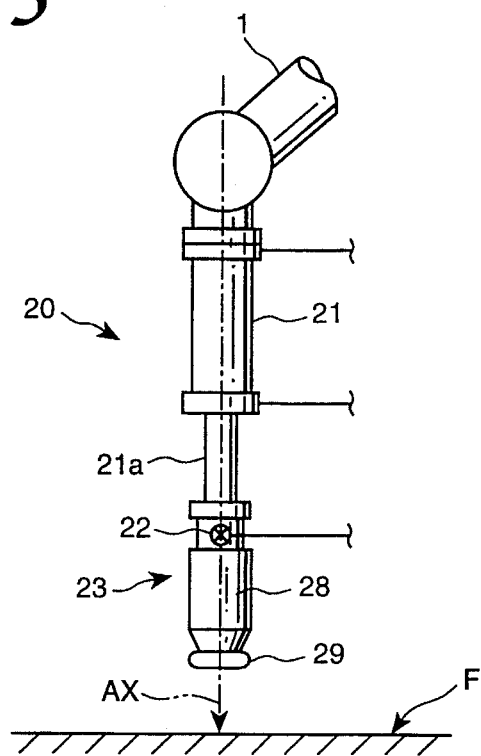
FIG. 5 is a schematic illustration of the polishing apparatus which is placed vertically.
Figure 6:
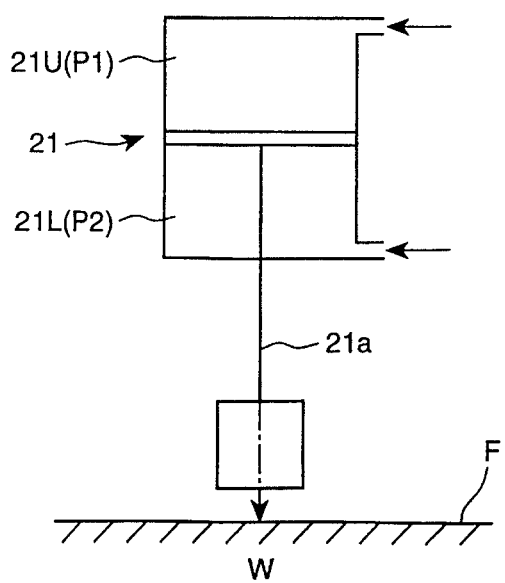
FIG. 6 is an explanatory illustration of the polishing apparatus of FIG. 5.

When polishing a surface F is placed horizontally with a predetermined polishing pressure $P_o$, and robot arm 1 places the polishing apparatus 20 so as to direct its center axis AX vertically as shown in FIGS. 5 and 6. Then, pressure P1 and P2 introduced into the upper and lower pressure chambers 21U and 21L of the pneumatic cylinder 21 are controlled by the controller 12 so as to meet the following relation:

$$P1-P2=P_o-W/S \qquad (1)$$

where W is the dead weight of the polishing tool 22; and
S is the pressure receiving area of the piston 21a.

Figure 7:
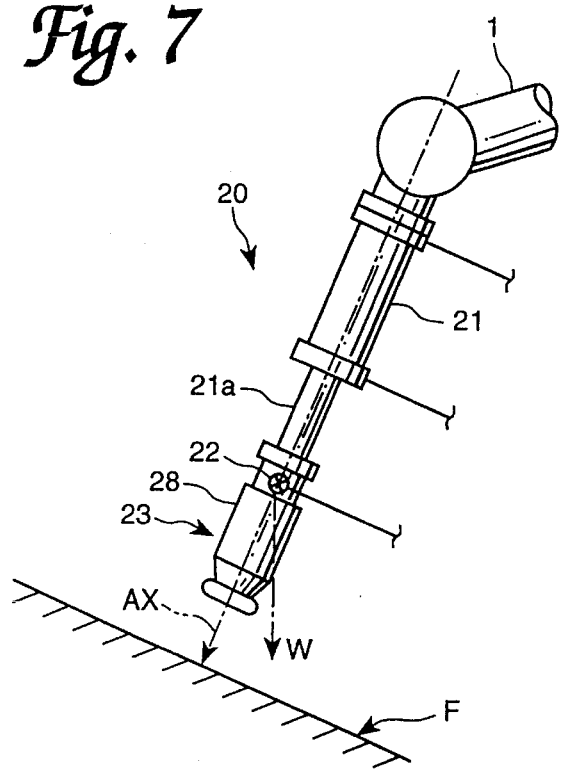
FIG. 7 is a schematic illustration of the polishing apparatus which is inclined at an angle.
Figure 8:
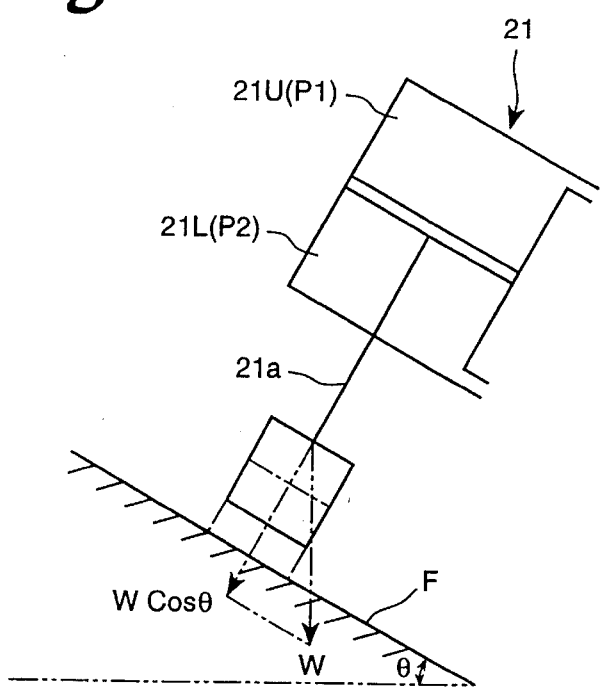
FIG. 8 is an explanatory illustration of the polishing apparatus of FIG. 7.

That is, when introducing the pressure P1 equal to the predetermined polishing pressure $P_o$ into the upper pressure chamber 21U of the cylinder 21 through the pressure line 6, the pressure P2 to be introduced into the lower pressure chamber 21L of the cylinder 21 through the pressure line 7 is controlled to be equivalent to a pressure W/S so as to cancel the dead weight W of the polishing tool 22 acting on the surface F. For this control, the controller 12 controls the electromagnetic valve 41 to regulate the pressure P1 to the same level as the predetermined polishing pressure $P_o$ and the electromagnetic valve 42 to regulate the pressure P2 to the same level as the equivalent pressure W/S. Thus, only the pressure P1 in the upper pressure chamber 21U is applied vertically on the surface F through the piston rod 21a. On the other hand, when polishing a surface F inclined at an angle with respect to a horizontal plane with the predetermined polishing pressure $P_o$, the robot arm 1 places the polishing apparatus 20 so as to direct the center axis AX perpendicularly to the surface F as shown in FIGS. 7 and 8. Then, the pressure P1 and P2 introduced into the upper and lower pressure chambers 21U and 21L of the cylinder 21 are controlled by the controller 12 so as to meet the following relation:

$$P1-P2=P_o-W\times Cos\Theta/S \qquad (2)$$

The controller 12 controls the electromagnetic valve 6 to maintain the pressure P1 at the same level as the predetermined polishing pressure $P_o$ and the electromagnetic valve 7 to regulate the pressure P1 to the same level as the equivalent pressure $W \times Cos\Theta/S$.

It should be noted that the dead weight W of the polishing tool 23 acting on a horizontal surface F is hereafter referred to as a standard load $W_o$ of the cylinder 21, which is invariable, when the center axis AX of the polishing apparatus 20 is placed vertically, and is hereafter referred to as an effective load $W_e$ of the cylinder 21, which is otherwise expressed by $W \times Cos\Theta$, when the center axis AX of the polishing apparatus 20 is placed perpendicularly to a surface F inclined at an angle $\Theta$ relative to a horizontal plane.

The controller 12 includes a signal converter 121 for transforming a signal from the strain gauge sensor 22 into the angle of inclination of the center axis AX of the polishing apparatus 20, a calculation operation means 122 for calculating pressure P1 and P2 to be introduced into the upper and lower pressure chambers 21U and 21L according to the inclination angle $\Theta$ of the polishing apparatus AX, and a pressure control means 123 for controlling the electromagnetic valves 41 and 42 of the pressure regulating means 4. In this instance, the controller 12 controls the electromagnetic valve 42 so as to change the pressure introduced into the lower pressure chamber 21L from the standard load $W_o$ to an effective load $W \times Cos\Theta$ while controlling the electromagnetic valve 41 so as to maintain the pressure introduced into the upper pressure chamber 21U at the predetermined polishing pressure $P_o$. Otherwise, the controller 12 may control the electromagnetic valve 41 so as to change the pressure introduced into the upper pressure chamber 21U by increasing the predetermined polishing pressure $P_o$ by a difference between the standard and effective loads (i.e. $W \times (1-Cos\Theta)$ while controlling the electromagnetic valve 42 so as to maintain the pressure introduced into the lower pressure chamber 21L at the standard pressure (W/S).

The sequential control of surface polishing of the polishing apparatus 20 shown in FIG. 1 will be described by example with respect to polishing of a surface, such as a car body surface, with reference to FIG. 9.

As was previously described, when a surface F of the car body with a coat of paint to be polished is horizontal as shown in FIG. 5, the controller 12 controls the pressure regulating means 4 to provide a pressure P1 equal to the predetermined polishing pressure $P_o$ and a pressure P2 equivalent to a pressure determined based on the standard load $W_o$.

Referring to FIG. 9, when the polishing apparatus 20 is shifted from the horizontal portion of the car body surface F (FIG. 5) to a portion of the car body surface F inclined at an angle $\Theta$ with respect to the horizontal plane (FIG. 7) and is positioned so as to place the center axis AX of the polishing apparatus 20 in alignment with a line perpendicular to the car body surface F and force the polishing pad 29 against the car body surface F at step S101, then, at step S102, a signal from the strain gauge sensor sensor 22 is decoded into an angle at which the surface F is inclined with respect to the horizontal plane in the signal converter 121. Subsequently, at step S103, a corrective value $P_c$ is calculated based on the effective load $W_e$ and the standard load $W_o$ in the operation means 122. The control means 123 controls the electromagnetic valves 41 and 42 based on the corrective value $P_c$ at step S104 so as to balance the cylinder 21 at step S105. Thereafter, at step S106, the control means 123 controls the electromagnetic valve 41 so as to increase the pressure in the upper pressure chamber 21U to the predetermined polishing pressure. Subsequently to polishing of the portion of the car body surface F by the polishing pad 29, a decision is made at step S107 as to whether all intended portions of the car body surface F have been polished. This decision is repeated until polishing of all intended portions of the car body surface F is performed.

With this method and apparatus for polishing a surface in which a polishing tool is positioned perpendicularly to a surface, the polishing pressure is controlled to be always at a pressure predetermined in spite of angles at which the surface is inclined with respect to a horizontal plane. Accordingly, polishing a free surface, such as a car body surface with a coat of paint, is performed precisely by a simple configuration of the polishing apparatus.

Referring to FIG. 10, a polishing apparatus 20A in accordance with another preferred embodiment of the present invention is schematically shown. This polishing apparatus is fixedly secured to an arm 1 of a general purpose robot or manipulator (not shown) well known to those skilled in the art. The polishing apparatus 20A has a polishing tool 23 with a motor (not shown) built therein and a polishing pad 29 driven by the motor. Between the robot arm 1 and the polishing apparatus 20A there is provided a pressure sensor 30. This robot positions the polishing apparatus 20A above a portion of a surface F with the coat of paint to be polished so that the center axis AX of the polishing apparatus 20A is placed perpendicularly relative to the surface F.

The robot moves the polishing apparatus 20A downward at a specific constant speed so as to bring the polishing pad 29 in contact with a paint defect of the surface F. Pressure applied to the surface F through the polishing pad 29 is monitored by the pressure sensor 30. When the pressure sensor 30 detects a specific pressure, the robot maintains the polishing apparatus 20A in the position.

A controller 12A includes a signal transformer 121A for transforming a signal from the pressure sensor 30 to a pressure signal, a speed control (motion control means) 122A for providing a stop signal for stopping the downward motion of the robot arm 1 upon the detection of the specific pressure, and a robot control 123A for causing the robot arm 1 to move downward at a specific constant speed control and stopping it upon the provision of a stop signal from the motion control means 122A. The controller 12A further includes a motor drive (control means) 124A for starting the motor to rotate upon the provision of a stop signal from the speed control 122A.

The sequential control of surface defect polishing of the polishing apparatus 20A shown in FIG. 10 will be described by example with respect to polishing of a surface, such as a car body surface, with reference to FIG. 11.

Figure 11:
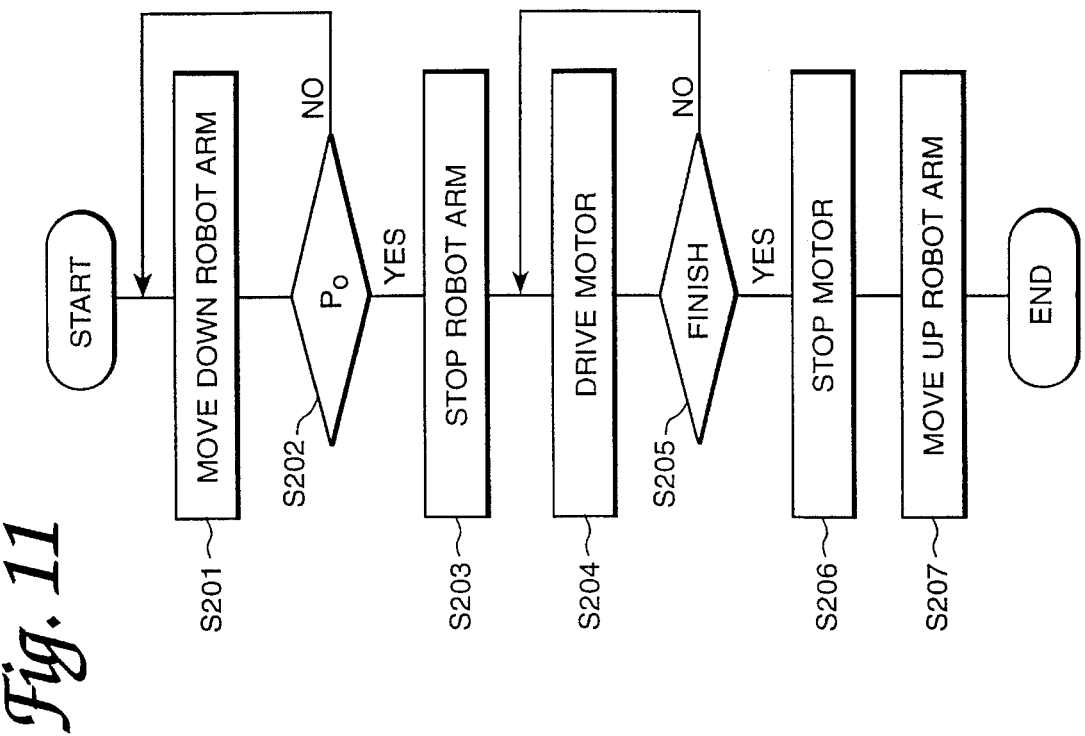
FIG. 11 is a flow chart of the sequence control of surface polishing by the polishing apparatus shown in FIG. 10.

Referring to FIG. 11, which is a flow chart of the sequential control of surface defect polishing, the robot moves the robot arm 1 vertically downward at step S201 so as to bring the polishing pad 29 into contact with the surface F. Then, a decision is made based on a pressure signal from the pressure sensor 30 at step S202 as to whether the motion control means 122A detects a pressure signal representative of the specific polishing pressure ($P_o$). If the motion control means 122A detects the specific polishing pressure, it provides a stop signal to the robot control means 123A. If not, the robot continues to move the polishing apparatus 20A downward until the motion control means 122A detects the specific polishing pressure.

Figure 12:
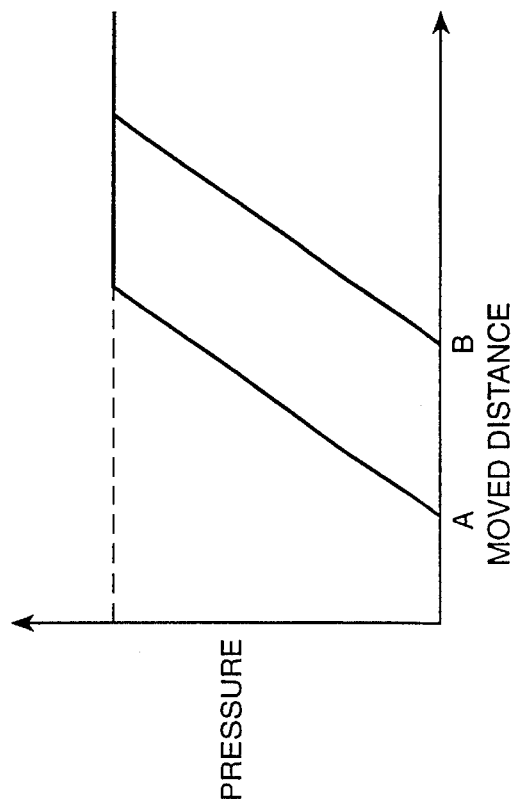
FIG. 12 is a diagram showing the relation between pressure and moved distance.

In response to the stop signal, on one hand, the robot control means 123A stops the downward motion of the robot arm 1 at step S203 and on the other hand, the motor control means 124A causes the motor to rotate at step S104. This specific pressure is constant in spite of distances (A and B) of the polishing pad 29 from the different surface levels F(A)

and F(B) as shown in FIG. 12. Subsequently, a decision is made at step S205 as to whether all portions of the surface F have been polished. This decision is made until polishing of all portions of the surface have been finished. After the completion of polishing, the motor control means 124A stops the motor at step S206. Thereafter, at step S207, the robot control means 123A causes the polishing apparatus 20A to move vertically upward to a predetermined position. After stopping the motion of the robot, the control terminates. In such a way, the polishing apparatus 100 is controlled to perform polishing of a surface F with the specific polishing pressure in spite of distances between surface levels to be polished and the polishing pad 29.

Although, in the above-described embodiment, the polishing apparatus 20A is moved vertically downward at a specific constant speed, the speed at which the polishing apparatus is moved downward may be changed stepwise until the specific polishing pressure is developed between the polishing pad 29 and the surface F.

Figure 13:
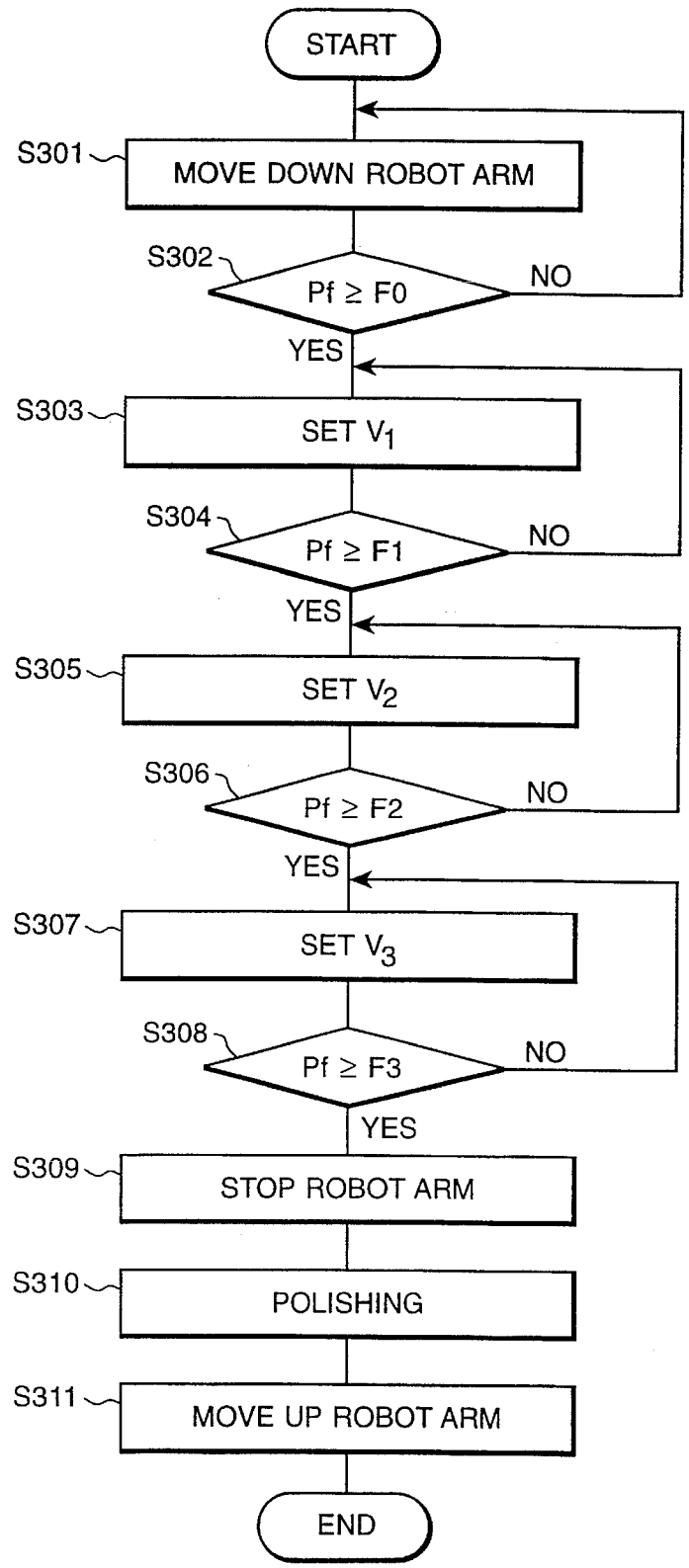
FIG. 13 is a flow chart of another sequence control of surface polishing by the polishing apparatus shown in FIG. 10.
Figure 14:
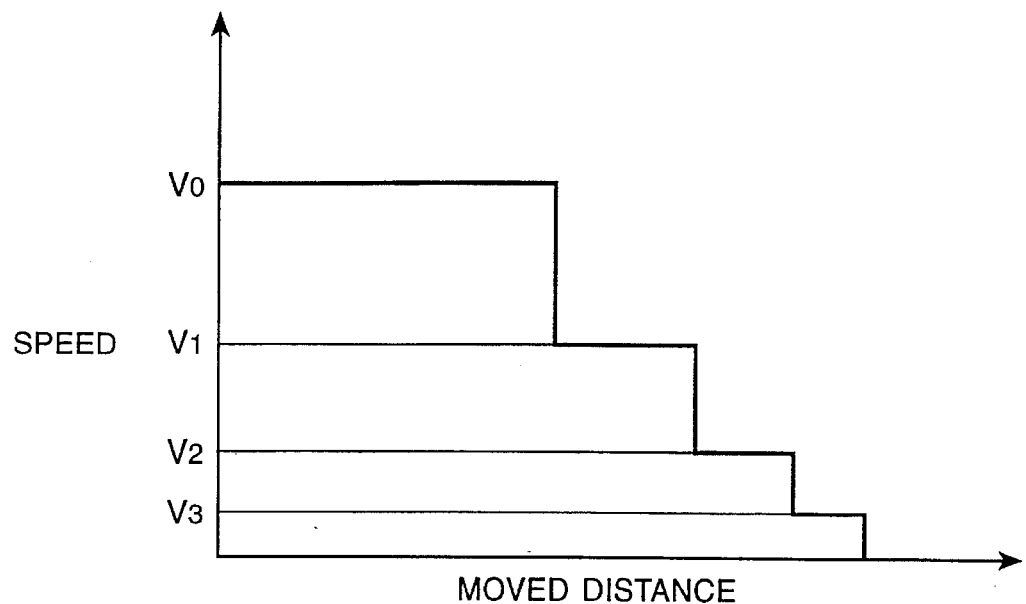
FIG. 14 is a diagram showing the relation between speed and moved distance.
Figure 15:
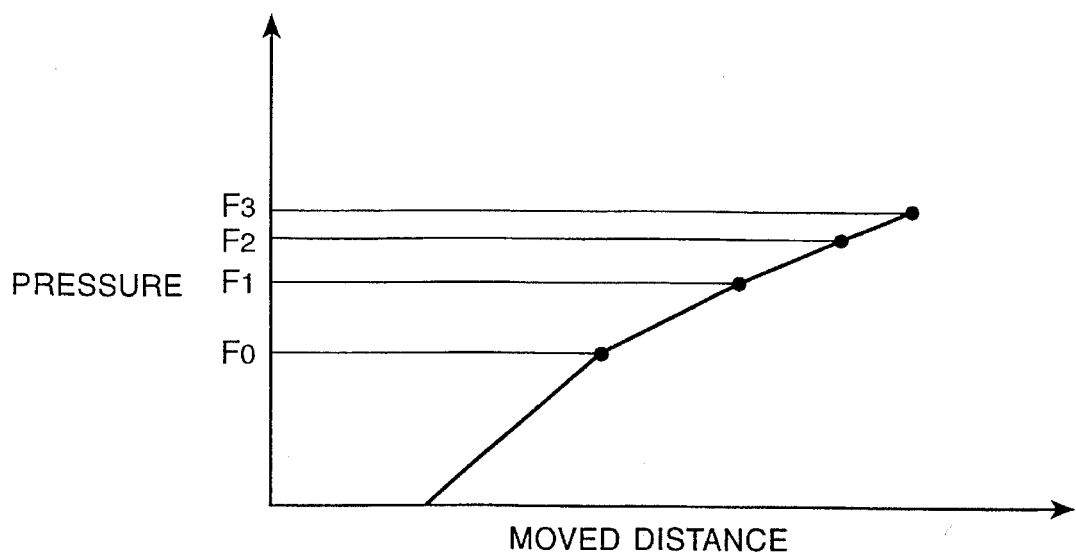
FIG. 15 is a diagram showing the relation between pressure and moved distance.

Referring to FIGS. 13 to 15, which is a flow chart of the sequential control of speed, the sequence starts and control proceeds to step S301 where the robot control means 123A causes the robot to move the robot arm 1 vertically downward at an initial constant speed $V_o$ so as to bring the polishing apparatus 20A into contact with the surface F. Then, a decision is made based on a pressure signal sent from the pressure sensor 30 at step S302 as to whether the motion control means 122A detects a pressure signal representative of an initial specific pressure $F_o$. If the initial specific pressure $F_o$ has not been developed, then, the robot arm 1 is continuously moved downward at the initial constant speed $V_o$. On the other hand, when the initial specific pressure $F_o$ has been established, then, a first constant speed $V_1$ larger than the initial constant speed $V_o$ is established at step S303 and the robot arm 1 is moved downward at the first constant speed $P_1$. Thereafter, a decision is made at step S304 as to whether the motion control means 122A detects a pressure signal representative of a first specific pressure $F_1$. When the first specific pressure $F_1$ has been established, then, a second constant speed $V_2$ larger than the first constant speed $V_1$ is established at step S305 and the robot arm 1 is moved downward at the second speed $V_2$. Then, a decision is made at step S306 as to whether the motion control means 122A detects a pressure signal representative of the second specific pressure $F_2$. When the second specific pressure $F_2$ has been established, then, a third constant speed $V_3$ larger than the second constant speed $V_2$ is established at step S307 and the robot arm 1 is moved downward at the third speed $V_3$. At step S308, a decision is made as to whether the motion control means 122A detects a pressure signal representative of a third specific pressure $F_3$ which is a predetermined polishing pressure. If the third specific pressure $F_3$ has not been developed, then, the robot arm 1 is continuously moved downward at the third constant speed $V_3$. On the other hand, when the third specific pressure $f_3$ has been established, the downward movement of the robot arm 1 is stopped at step S309. Subsequently, the motor control means 124A causes the motor to rotate so as to polish the surface F at step S310. After the completion of polishing of the surface F, the robot control means 123A moves the robot arm 1 upward to a predetermined position at step S311 and terminates the polishing control.

With this method and apparatus for polishing surfaces, because the pressure applied to a surface through the polishing pad is monitored so as to change the critical judging pressure stepwise and to establish the speed at which the robot arm is continuously moved downward stepwise according to the critical judging pressure, a time necessary to develop the predetermined polishing pressure is shortened.

It is to be understood that, although the present invention has been described with respect to preferred embodiments thereof, various other embodiments and variants may occur to those skilled in the art and fall within the scope and spirit of the invention. Such other embodiments and variants are intended to be covered by the following claims.

What is claimed is:

1. An apparatus for polishing a surface comprising:

a polishing tool connected so as to be directed perpendicularly to a surface;

a pressure cylinder for applying a predetermined polishing pressure and controlled by regulation of a pressure introduced into the pressure cylinder;

angle sensor means disposed between said pressure cylinder and said polishing tool for detecting an angular inclination of said polishing tool with respect to a horizontal plane; and control means for (1) determining a difference between an effective load of said polishing tool, defined as a dead weight of said polishing tool when inclined at said angular inclination, and a standard load of said polishing tool, defined as a dead weight of said polishing tool when positioned vertically, and (2) regulating the pressure introduced into the pressure cylinder responsive to the determined difference.

2. An apparatus as defined in claim 1, wherein said angle sensor means comprises a strain gauge.

3. An apparatus as defined in claim 1, and further comprising a universal joint disposed between said angle sensor means and said polishing tool.

4. An apparatus for polishing a surface comprising:

a polishing tool directed perpendicularly to the surface;

a cylinder into which pressure is introduced to apply a predetermined polishing pressure;

pressure regulating means for controlling said predetermined pressure by varying a pressure introduced into said cylinder;

a pressure sensor for detecting pressure received by said polishing tool as a reaction force from a defect of said surface;

polishing tool control means for (1) moving said polishing tool downward against the defect at a speed determined according to said pressure detected by said pressure sensor so that said speed decreases as said pressure detected by said pressure sensor increases and (2) stopping downward movement of said polishing tool when a predetermined pressure is detected by said pressure sensor; and drive control means for driving said polishing tool so as to polish said surface.

5. An apparatus as defined in claim 4, wherein said polishing tool control means changes the speed stepwise according to said pressure detected by said pressure sensor.

6. A method of polishing a surface having a coat of paint thereon comprising the steps of:

directing a polishing tool, connected to a cylinder, to the surface;

applying a predetermined polishing pressure to said polishing tool;

detecting an angle at which said polishing tool is inclined with respect to a horizontal plane;

determining, from said angle, a difference between a standard load of said polishing tool, defined as a dead weight of said polishing tool when positioned vertically, and an effective load of said polishing tool, defined as a dead weight of said polishing tool when inclined with respect to said horizontal plane; and controlling the pressure applied to the polishing tool based on said difference.

7. A method of polishing a surface having a coat of paint thereon comprising the steps of:

directing a polishing tool, connected to a cylinder, to a surface;

applying a predetermined polishing pressure to said polishing tool;

detecting a pressure which said polishing tool receives as a reaction force from a defect of said surface;

moving said polishing tool downward against said defect at a speed determined according to said pressure which said polishing tool receives as said reaction force so that the speed decreases as the detected pressure increases;

stopping downward movement of said polishing tool when a predetermined pressure is detected; and driving said polishing tool so as to polish said surface.

8. A method as defined in claim 7, wherein the downward movement of the polishing tool is changed stepwise according to said pressure which said polishing tool receives as said reaction force.

* * * * *